(12) United States Patent
Barger

(10) Patent No.: US 10,628,983 B2
(45) Date of Patent: Apr. 21, 2020

(54) SYSTEMS AND METHODS FOR MULTI-SENSOR IMAGE CAPTURE

(71) Applicant: Digital Domain 3.0, Inc., Los Angeles, CA (US)

(72) Inventor: Michael Aaron Barger, Stevenson, WA (US)

(73) Assignee: Digital Domain 3.0, Inc., Los Angeles, CA (US)

( * ) Notice: Subject to any disclaimer, the term of this patent is extended or adjusted under 35 U.S.C. 154(b) by 0 days.

(21) Appl. No.: 16/073,252

(22) PCT Filed: Dec. 16, 2016

(86) PCT No.: PCT/US2016/067345
§ 371 (c)(1),
(2) Date: Jul. 26, 2018

(87) PCT Pub. No.: WO2017/106761
PCT Pub. Date: Jun. 22, 2017

(65) Prior Publication Data
US 2019/0043234 A1    Feb. 7, 2019

Related U.S. Application Data

(60) Provisional application No. 62/269,872, filed on Dec. 18, 2015.

(51) Int. Cl.
*G06T 11/60* (2006.01)
*H04N 5/232* (2006.01)
*H04N 5/353* (2011.01)

(52) U.S. Cl.
CPC ......... *G06T 11/60* (2013.01); *H04N 5/23238* (2013.01); *H04N 5/353* (2013.01); *G06T 2207/20221* (2013.01)

(58) Field of Classification Search
None
See application file for complete search history.

(56) References Cited

U.S. PATENT DOCUMENTS

2009/0153710 A1* 6/2009 John ............... H04N 5/23248
348/296
2012/0063637 A1* 3/2012 Tardif ................. G06T 11/00
382/103

(Continued)

FOREIGN PATENT DOCUMENTS

EP    2091223 B1    9/2013

OTHER PUBLICATIONS

International Searching Authority, "International Search Report," issued in connection with PCT/US16/67345 dated Mar. 22, 2017, 2 pages.

(Continued)

*Primary Examiner* — Kee M Tung
*Assistant Examiner* — Patrick F Valdez
(74) *Attorney, Agent, or Firm* — Loeb & Loeb LLP

(57) ABSTRACT

A system captures and combines image data from a plurality of image sensors to generate combined images. A plurality of individual rolling-shutter image sensors comprise a pair of adjacent image sensors. A controller combines image data captured by the plurality of individual rolling-shutter image sensors to generate a combined image, the combined image comprising first pixels captured by a first one of the adjacent image sensors, second pixels captured by a second one of the adjacent image sensors and a first boundary between the first pixels and the second pixels. A first one of the adjacent image sensors is configured to have a first integration and readout scanning direction along a first scanning axis and the second one of the adjacent image sensors is configured to have a second integration and readout scanning direction along the first scanning axis. Both of the first and second (Continued)

integration and readout scanning directions are oriented toward (or away from) the first boundary.

12 Claims, 9 Drawing Sheets

(56) References Cited

U.S. PATENT DOCUMENTS

| | | |
|---|---|---|
| 2013/0113990 A1 | 5/2013 | Cullum et al. |
| 2013/0157282 A1 | 6/2013 | Bouzid et al. |
| 2013/0251194 A1 | 9/2013 | Schamp |
| 2014/0092289 A1* | 4/2014 | Takahashi .............. H04N 5/374 348/308 |
| 2014/0320708 A1* | 10/2014 | Marks ................... G02B 13/06 348/262 |
| 2016/0050370 A1* | 2/2016 | Campbell ............ H04N 13/239 348/36 |

OTHER PUBLICATIONS

International Searching Authority, "Written Opinion of the International Searching Authority," issued in connection with PCT/US16/67345 dated Mar. 22, 2017, 5 pages.

* cited by examiner

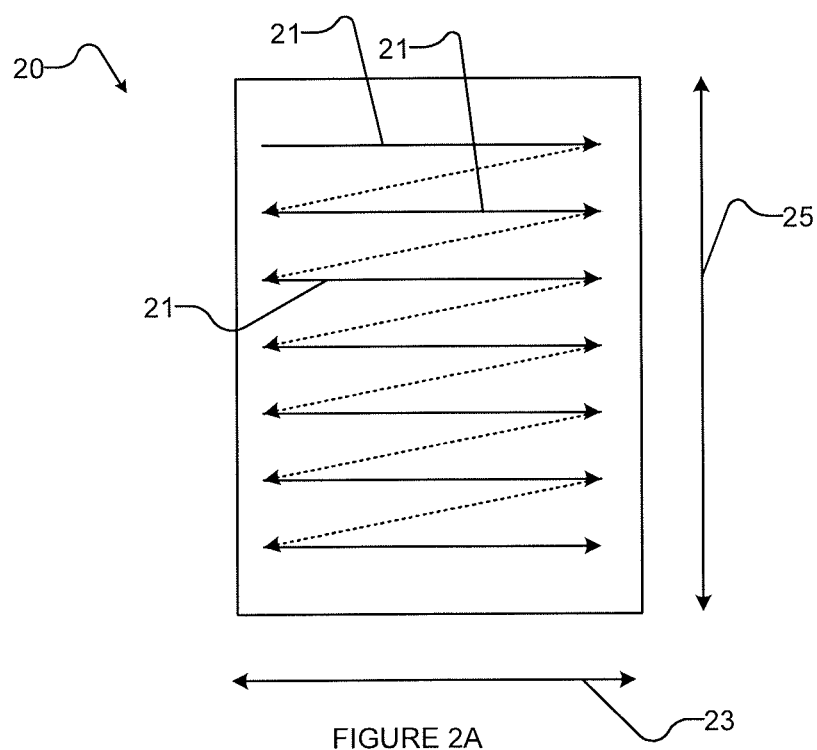
FIGURE 2A
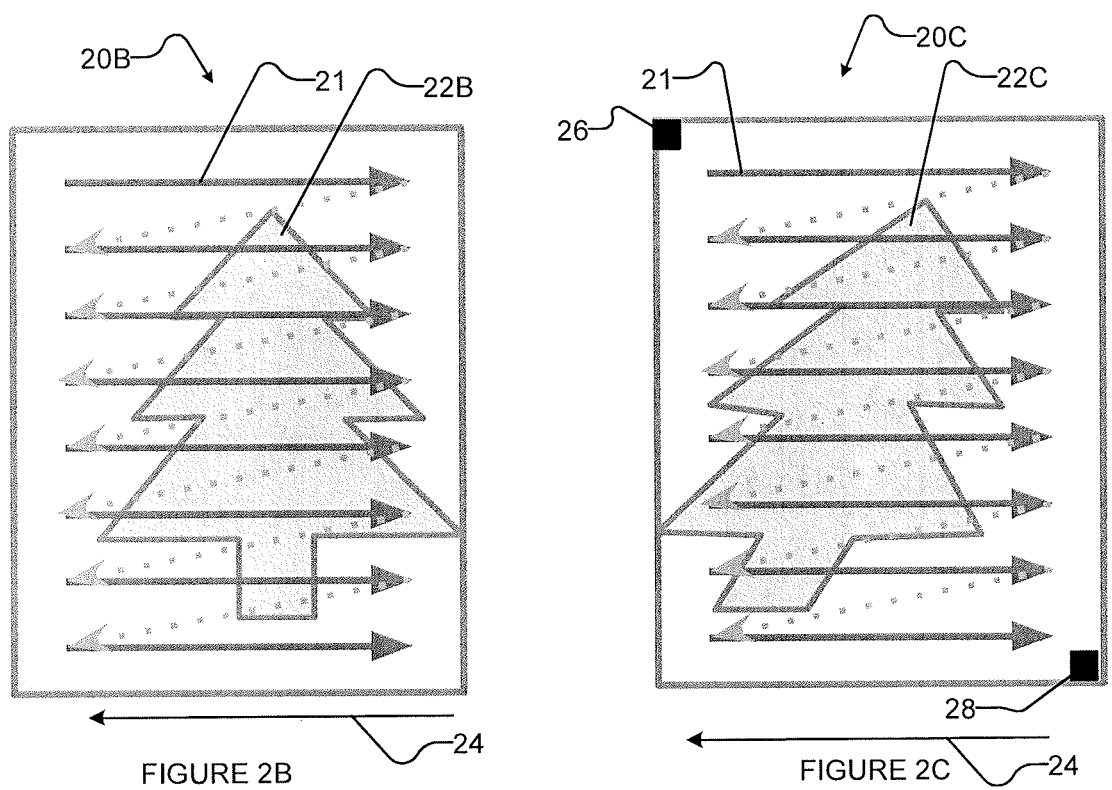
FIGURE 2B
FIGURE 2C

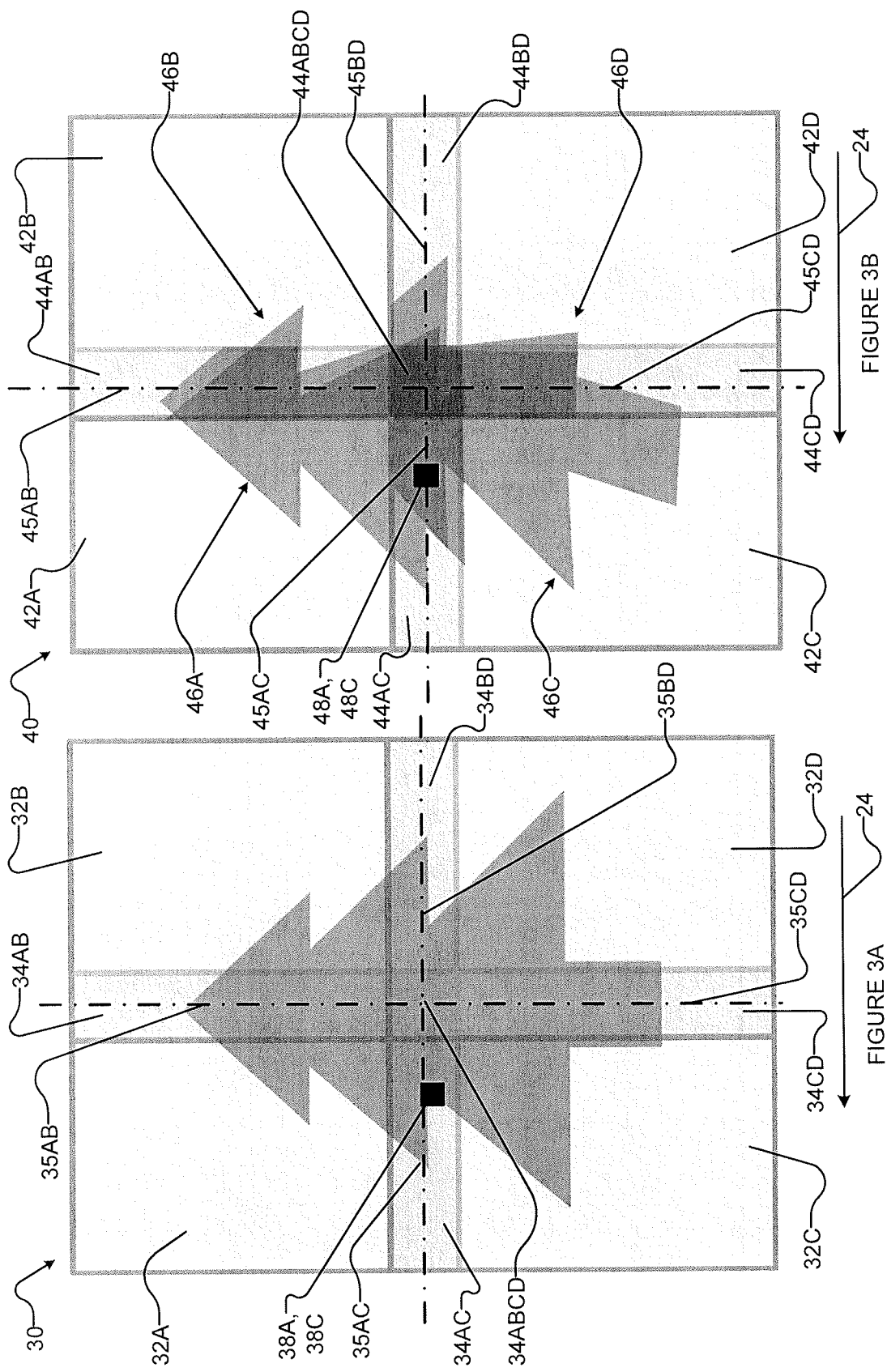

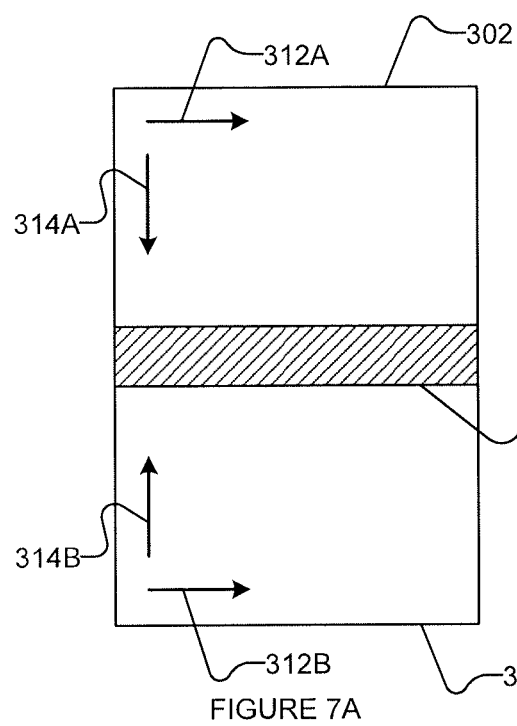
FIGURE 7A
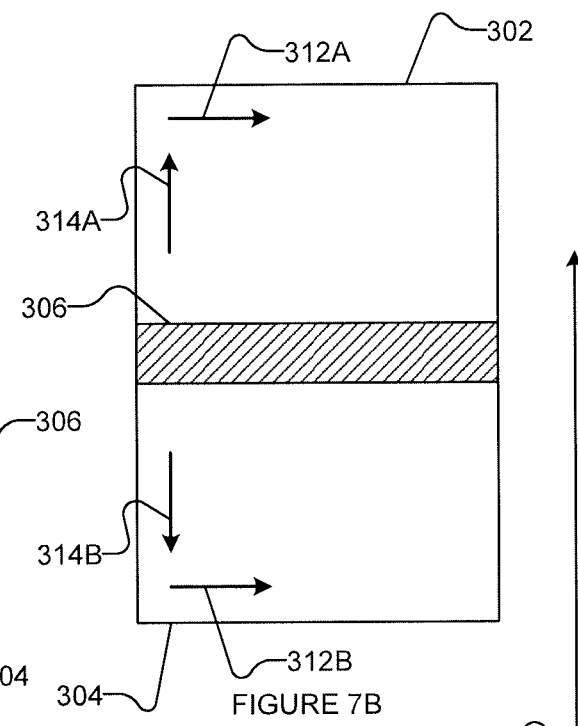
FIGURE 7B
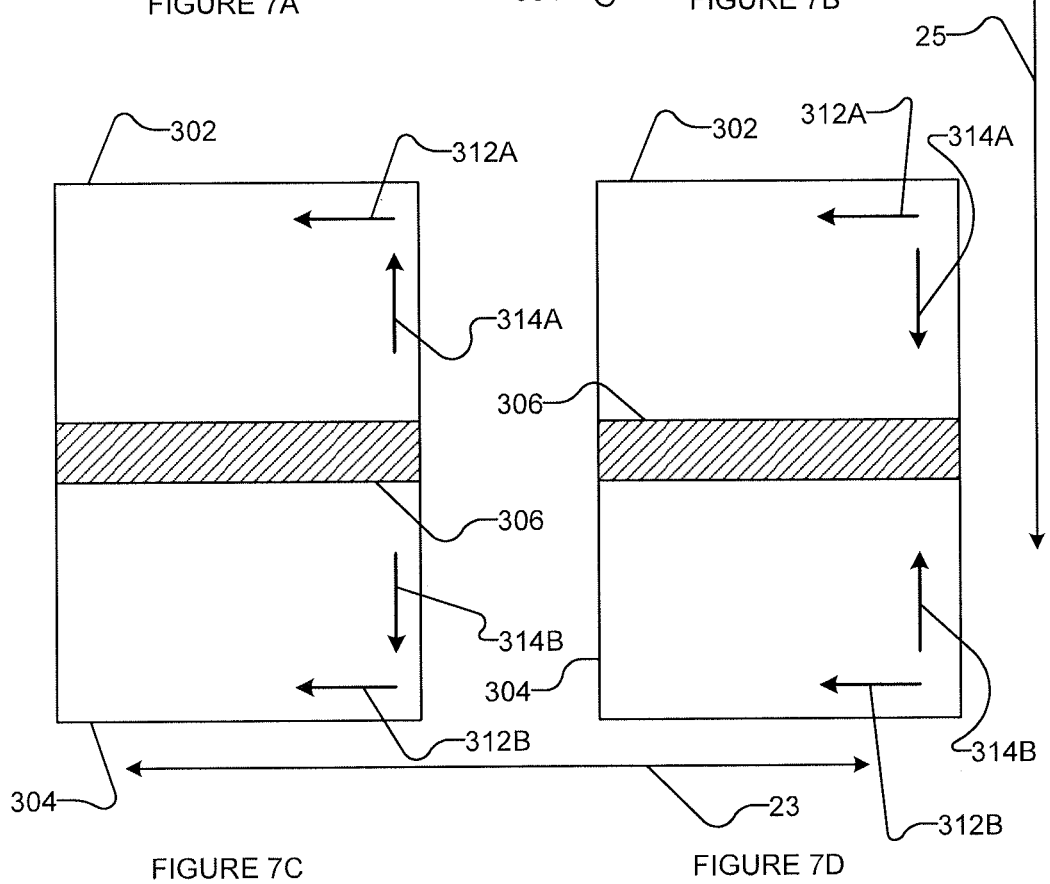
FIGURE 7C
FIGURE 7D

SYSTEMS AND METHODS FOR MULTI-SENSOR IMAGE CAPTURE

CLAIM OF PRIORITY

This is a U.S. National Stage entry of PCT/US2016/067345, filed on Dec. 16, 2016, which claims the benefit of U.S. Provisional Patent Application 62/269,872, filed on Dec. 18, 2015, which is hereby incorporated by reference for all purposes.

TECHNICAL FIELD

The present disclosure relates to systems and methods for image capture wherein individual images from multiple image sensors are combined to provide a combined image. Particular embodiments provide systems and methods for generating combined video frame images, each combined video frame image comprising image data from a combination of a corresponding plurality of individual images captured by a corresponding plurality of image sensors, and/or for generating otherwise successively captured combined images, each combined image comprising image data from a combination of a corresponding plurality of individual images captured by a corresponding plurality of image sensors.

BACKGROUND

Image sensors are commonly used for the acquisition of images, such as by still photography, videography, and the like. Image sensors capture images by exposing a plurality of pixels to light and then reading the individual pixels. For a given image being captured, every pixel of an image sensor will generally have the same integration duration (often referred to as the integration time). Integration duration represents the duration of time between pixel sensor reset and sampling and is analogous to exposure duration in film photography. Despite pixels having common integration duration, reading or capturing image data from the sensor is typically performed sequentially on a pixel-by-pixel basis, typically in serial row-column pixel read pattern operating at a frequency, which may be referred to as the pixel clock.

FIG. 2A shows a schematic illustration of an example image sensor 20. Image sensor 20 has a serial row-column pixel readout pattern, where pixels are read from sensor 20 along each individual row 21 before jumping (along the diagonals illustrated using dotted lines) from the end of a given row 21 to the beginning of a subsequent row 21. That is, in the case of the FIG. 2A illustration, scanning advances in a particular direction along row axis 23 for each given row 21 before proceeding to each subsequent row 21 along column axis 25.

The two most common types of image sensors are referred to as "global shutter" sensors and "rolling shutter" sensors. Image sensor hardware (such as CMOS image sensor hardware) is typically configured for use in either a global shutter sensor configuration or a rolling shutter sensor configuration. A global shutter image sensor will expose all of the active pixels of the sensor (typically an array of rows and columns of pixels) substantially simultaneously and for substantially the same integration duration. That is, every active pixel of the global shutter image sensor begins its integration duration at substantially the same time and ends its integration duration at substantially the same time. After all of the active pixels have undergone integration, the individual pixels of the global shutter image sensor are flushed to suitable "hold circuitry" to prepare the sensor for a subsequent integration. Image data is then read (typically sequentially) from the hold circuitry. Once every pixel of a first image has been flushed from the sensor to the hold circuitry, the global shutter image sensor may capture another image by again undergoing simultaneous integration of all of its pixels.

In contrast to a global shutter image sensor, a rolling shutter image sensor integrates different portions of the image sensor (e.g. individual pixels or groups of pixels, such as one or more lines or columns of pixels) at different times (i.e. with different integration start and stop times). As soon as a particular portion of the rolling shutter image sensor is integrated, the pixels in that portion of the sensor may be sequentially read. Once the pixels in that particular portion of the rolling shutter image sensor are read, they may be reset and integration of those pixels may begin again immediately. When compared to the global shutter image sensor, the rolling shutter image sensor dispenses with the need for hold circuitry required for the global shutter image sensor.

In addition to the need for such hold circuitry, another drawback associated with global shutter sensors occurs in the context of capturing video data or other circumstances, where it may be desirable to capture multiple successive images (e.g. video image frames) at relatively high rates (e.g. 24, 30 or 60 images/frames per second). To achieve framerates and light sensitivity comparable to those of rolling shutter sensors, global shutter sensors typically require pixel dimensions which are large in comparison to those of rolling shutter image sensors (to allow contact with more photons during an integration interval) and may consequently require physically larger and more expensive optics.

While there can be advantages (such as those discussed above) associated with using a rolling shutter sensor over a global shutter sensor, rolling shutter image sensors can introduce artifacts into images. For example, if a rolling shutter image sensor undergoes rapid translational or rotational movement while reading image data (or, conversely, the objects in the image move rapidly with respect to the sensor), resultant images may be skewed and/or otherwise distorted.

FIGS. 2B and 2C respectively schematically show example images 22B and 22C captured by an example global-shutter sensor 20B and an example rolling-shutter sensor 20C. Sensors 20B and 20C are moving in movement direction 24 relative to the object being imaged (in the illustrated example, a tree). Global-shutter sensor 20B captures image 22B by having each pixel undergo integration at the same time (i.e. with the same integration start and stop times). After flushing the captured image to corresponding hold circuitry and a sequential readout of the pixels in accordance with the readout pattern of FIG. 2A, image 22B is substantially free of skew or other distortions.

On the other hand, the FIG. 2C rolling-shutter sensor 20C captures image 22C by having portions of sensor 20C undergo integration with different start and stop times. In the particular case of the FIG. 2C example, individual pixels of sensor 20C undergo integration in accordance with a pattern similar to the pixel readout pattern of FIG. 2A (i.e. along each row 21 from left to right and then jumping from the end of each row 21 to the beginning of a subsequent row 21, as illustrated schematically by the diagonal dashed lines in FIG. 2C). Individual pixels of sensor 20C may then be read out using the same readout pattern. The resultant image 22C shows that later-integrated pixels in image 22C (i.e. pixels having integration and readout times closer to those of the last pixel 28 to be integrated and read) may have image data that is translated relative to the image data provided by earlier-integrated pixels in image 22C (i.e. pixels having integration and readout times closer to those of the first pixel 26 to be integrated and read). The result is an apparent skew of image 22C relative to image 22B.

By way of non-limiting demonstrative example only, suppose sensor 20C is a non-limiting example rolling-shutter WUXGA image sensor with total pixel dimensions of 1980×1300 (including blanking zones) or active pixel dimensions of 1920×1200 (without blanking zones). If sensor 20C captures video data with a frame rate of 30 frames per second (FPS), the minimum pixel clock frequency would be ~77.22 MHz (i.e. 30 frames per second* (1980*1300 pixels per frame)). If the integration time was 15 ms, then the image data corresponding to first pixel 26 would be captured (i.e. pixel 26 undergoes integration) between t=0 and 15 ms, and image data corresponding to last pixel 28 would be captured (i.e. pixel 28 undergoes integration) between 30.77 ms and 45.77 ms. This is a substantial delay, particularly if the sensor and/or any objects being imaged are moving.

There is a general desire for systems and methods which reduce or ameliorate at least some of the artifacting associated with rolling-shutter image sensors. The Applicant has discovered that the artifacting exhibited by rolling-shutter image sensors may be exacerbated in certain applications (described below), where images from a plurality of individual rolling shutter image sensors are stitched together or otherwise combined to provide a combined image. There is a general desire for systems and methods which reduce or ameliorate at least some of the artifacting associated with combining the images from a plurality of individual rolling shutter image sensors in such applications.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a system for capturing and combining image data from a plurality of image sensors to generate combined images. The system comprises: a plurality of individual rolling-shutter image sensors comprising at least one first pair of adjacent image sensors; a controller configured to combine image data captured by the plurality of individual rolling-shutter image sensors to generate a combined image and store the combined image in a memory accessible to the controller, the combined image comprising first pixels from a first individual image captured by a first one of the first pair of adjacent image sensors, second pixels from a second individual image captured by a second one of the first pair of adjacent image sensors and a first boundary between the first pixels and the second pixels. The first one of the first pair of adjacent image sensors is configured to have a first integration and readout scanning direction along a first scanning axis and the second one of the first pair of adjacent image sensors is configured to have a second integration and readout scanning direction along the first scanning axis. Both of the first and second integration and readout scanning directions are oriented toward the first boundary or both of the first and second integration and readout scanning directions are oriented away from the first boundary.

Integration times for the first pixels adjacent to the first boundary and the second pixels adjacent to the first boundary may be relatively close to one another when compared to configurations where one of the first and second integration and readout scan directions is oriented toward the first boundary and the other one of the first and second integration and readout scan directions is oriented away from the first boundary.

The first one of the first pair of adjacent image sensors may have a first field of view and the second one of the first pair of adjacent image sensors may have a second field of view. The first and second fields of view may overlap one another in an overlap region. The boundary in the combined image may be located in the overlap region. Both of the first and second integration and readout scanning directions may be oriented toward the overlap region or both of the first and second integration and readout scanning directions may be oriented away from the overlap region.

The controller may be in communication with the plurality of individual rolling-shutter image sensors and may be configured, via the communication, to cause the first one of the first pair of adjacent image sensors to have the first integration and readout scanning direction and the second one of the first pair of image sensors configured to have the second integration and readout scanning direction. The controller may be configured to reverse an initial integration and readout scanning direction of the second one of the first pair of image sensors along the first scanning axis to cause the second one of the first pair of image sensors to have the second integration and readout scanning direction along the first scanning axis.

The first sensor may be configured to capture image data at a first pixel associated with the overlap region at a first integration time; and the second sensor may be configured to capture image data at a second pixel associated with the overlap region and corresponding to the first pixel (e.g. imaging a same portion of a scene within the overlap region as the first pixel) at substantially the first integration time. The first sensor may be configured to capture image data at a third pixel associated with the overlap region at a second integration time, the third pixel spaced apart from the first pixel along a second scanning axis non-parallel with the first scanning axis; and the second sensor may be configured to capture image data at a fourth pixel associated with the overlap region and corresponding to the third pixel (e.g. imaging a same portion of a scene within the overlap region as the first pixel) at substantially the second integration time.

The plurality of rolling-shutter image sensors may comprise a second pair of adjacent image sensors, a first one of the second pair of adjacent image sensors comprising the second one of the first pair of adjacent image sensors and a second one of the second pair of adjacent image sensors comprising a third image sensor. The combined image may comprise first pixels from a first individual image captured by the first one of the second pair of adjacent image sensors, second pixels from a second individual image captured by the second one of the second pair of adjacent image sensors and a second boundary therebetween. The first one of the second pair of adjacent image sensors may be configured to have a first integration and readout scanning direction along a second scanning axis and the second one of the second pair of adjacent image sensors may be configured to have a second integration and readout scanning direction along the second scanning axis, the second scanning axis non-parallel with the first scanning axis. Both of the first and second integration and readout scanning directions along the second scanning axis may be oriented toward the second boundary or both of the first and second integration and readout scanning directions along the second scanning axis may be oriented away from the second boundary.

Integration times for the first pixels from the first individual image captured by the first one of the second pair of adjacent image sensors and adjacent to the second boundary and the second pixels from the second individual image captured by the second one of the second pair of adjacent image sensors and adjacent to the second boundary may be relatively close to one another when compared to configurations where one of the first and second integration and readout scan directions along the second scanning axis is oriented toward the second boundary and the other one of the first and second integration and readout scan directions along the second scanning axis is oriented away from the first boundary.

The first one of the second pair of adjacent image sensors may have a third field of view, the second one of the second pair of adjacent image sensors may have a fourth field of view and the third and fourth fields of view may overlap one another in a second overlap region, the second boundary in the combined image located in the second overlap region. Both of the first and second integration and readout scanning directions along the second scanning axis may be oriented toward the second overlap region or both of the first and second integration and readout scanning directions along the second scanning axis may be oriented away from the second overlap region.

The controller may be in communication with the plurality of individual rolling-shutter image sensors and may be configured, via the communication, to cause the first one of the second pair of adjacent image sensors to have the first integration and readout scanning direction along the second scanning axis and the second one of the first pair of image sensors configured to have the second integration and readout scanning direction along the second scanning axis. The controller may be configured to reverse an initial integration and readout scanning direction of the second one of the second pair of image sensors along the second scanning axis to cause the second one of the second pair of image sensors to have the second integration and readout scanning direction along the second scanning axis.

The plurality of individual rolling-shutter image sensors may be arranged in a matrix, each of the plurality of individual rolling-shutter image sensors adjacent to one or more of the plurality of individual rolling-shutter image sensors along at least one of one or more scanning axes. The combined image may comprises one or more boundaries between one or more pairs individual images captured by one or more corresponding pairs of adjacent image sensors. For each first-axis pair of image sensors which are adjacent along the first scanning axis, the first-axis pair of image sensors may be configured to both have integration and readout scanning directions along the first scanning axis that are oriented toward their corresponding boundary or to both have integration and readout scanning directions along the first scanning axis that are oriented away from their corresponding boundary.

The controller may be in communication with the plurality of individual rolling-shutter image sensors and may be configured, via the communication, to cause each pair of image sensors which are adjacent along the first scanning axis to both have integration and readout scanning directions along the first scanning axis that are oriented toward their corresponding boundary or to both have integration and readout scanning directions along the first scanning axis that are oriented away from their corresponding boundary.

For each second-axis pair of image sensors which are adjacent along a second scanning axis non-parallel with the first scanning axis, the second-axis pair of image sensors may be configured to both have integration and readout scanning directions along the second scanning axis that are oriented toward their corresponding boundary or to both have integration and readout scanning directions along the second scanning axis that are oriented away from their corresponding boundary.

Another aspect of the invention provides a method for capturing and combining image data from a plurality of individual rolling-shutter image sensors comprising at least one first pair of adjacent image sensors to generate combined images. The method comprises: combining image data captured by the plurality of individual rolling-shutter image sensors to generate a combined image by combining first pixels from a first individual image captured by a first one of the first pair of adjacent image sensors and second pixels from a second individual image captured by a second one of the first pair of adjacent image sensors and determining a first boundary between the first pixels and the second pixels; and configuring the first one of the first pair of adjacent image sensors to have a first integration and readout scanning direction along a first scanning axis and the second one of the first pair of adjacent image sensors to have a second integration and readout scanning direction along the first scanning axis. Both of the first and second integration and readout scanning directions are oriented toward the first boundary or both of the first and second integration and readout scanning directions are oriented away from the first boundary.

Another aspect of the invention provides a system for capturing image data from a plurality of image sensors. The system comprises: a plurality of individual rolling-shutter image sensors comprising at least one first pair of adjacent image sensors, a first one of the first pair of adjacent image sensors having a first field of view, a second one of the first pair of adjacent image sensors having a second field of view and the first and second fields of view overlapping one another in an overlap region. The first one of the first pair of adjacent image sensors is configured to have a first integration and readout scanning direction along a first scanning axis and the second one of the first pair of adjacent image sensors is configured to have a second integration and readout scanning direction along the first scanning axis. Both of the first and second integration and readout scanning directions are oriented in directions from a location away from the overlap region toward the overlap region or both of the first and second integration and readout scanning directions are oriented in directions from the overlap region to a location away from the overlap region.

Another aspect of the invention provides method for capturing image data from a plurality of individual rolling-shutter image sensors, the method comprises: providing a plurality of individual rolling-shutter image sensors comprising at least one first pair of adjacent image sensors, a first one of the first pair of adjacent image sensors having a first field of view, a second one of the first pair of adjacent image sensors having a second field of view and the first and second fields of view overlapping one another in an overlap region; and configuring the first one of the first pair of adjacent image sensors to have a first integration and readout scanning direction along a first scanning axis and the second one of the first pair of adjacent image sensors to have a second integration and readout scanning direction along the first scanning axis. Both of the first and second integration and readout scanning directions are oriented in directions from a location away from the overlap region toward the overlap region or both of the first and second integration and readout scanning directions are oriented in directions from the overlap region to a location away from the overlap region.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 2A is a schematic view of an example image sensor row-column pixel readout pattern, which scans along each row from the beginning of the row to the end of the row and, from the end of each row, jumps to the beginning of a subsequent row. FIG. 2B is a schematic view of a global-shutter image sensor incorporating the FIG. 2A row-column pixel readout pattern. FIG. 2C is a schematic view of a rolling-shutter image sensor incorporating the FIG. 2A row-column pixel readout pattern.

FIG. 3A is a schematic view of a combined image comprising image data captured by an exemplary arrangement of a plurality of individual global-shutter image sensors. FIG. 3B is a schematic view of a combined image comprising image data captured by an exemplary arrangement of a plurality of individual rolling-shutter image sensors.

FIGS. 7A, 7B, 7C, and 7D (collectively and individually FIG. 7) are schematic views showing various combined images comprising image data captured by an exemplary arrangement of a pair of individual rolling-shutter image sensors according to various embodiments of this disclosure.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Embodiments of the present disclosure involve combining image data from a plurality of individual images captured by a corresponding plurality of individual rolling shutter image sensors to obtain combined images. The plurality of individual rolling shutter image sensors comprise one or more pairs of adjacent rolling shutter image sensors. Each combined image may comprise first pixels from a first individual image captured by a first one of a pair of adjacent image sensors, second pixels from a second individual image captured by a second one of the pair of adjacent image sensors and a boundary between the first pixels and second pixels. The first one of the pair of adjacent image sensors may be configured to have a first integration and readout scanning direction and the second one of the pair of image sensors may be configured to have a second integration and readout scanning direction. The second integration and readout scan direction may be reversed (along at least one read axis) relative to the first integration and readout scan direction, so each of the first and second integration and readout scanning directions is oriented toward the boundary or each of the first and second integration and readout scanning directions is oriented away from the boundary. In some embodiments, the integration times for the first pixels adjacent to the boundary and the second pixels adjacent to the boundary are relatively close to one another when compared to configurations where one of the first and second integration and readout scan directions is oriented toward the boundary and the other one of the first and second integration and readout scan directions is oriented away from the boundary.

Figure 1A:
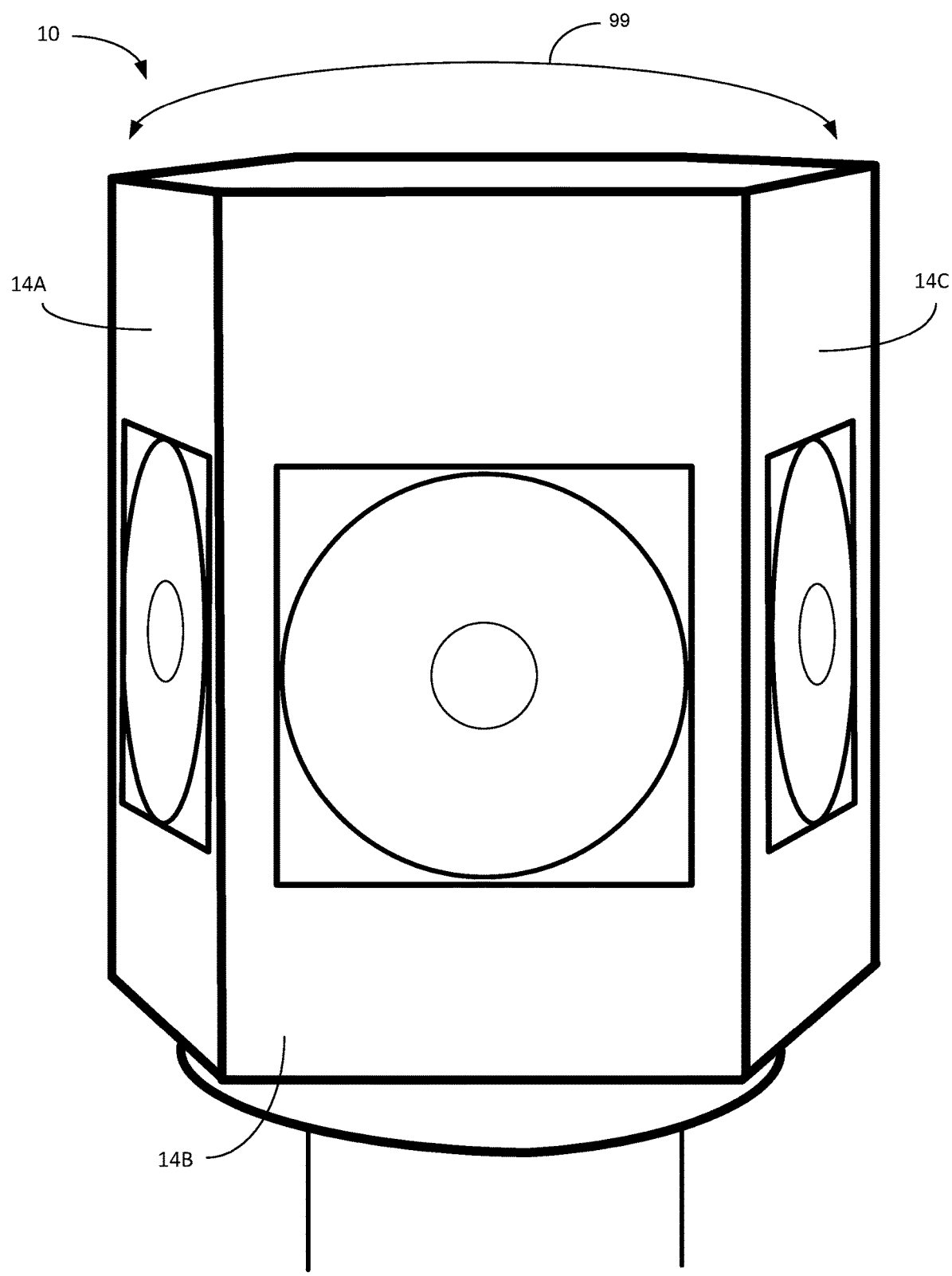
FIG. 1A is a perspective view of an example apparatus for multi-sensor image capture according to a particular embodiment.
Figure 1B:
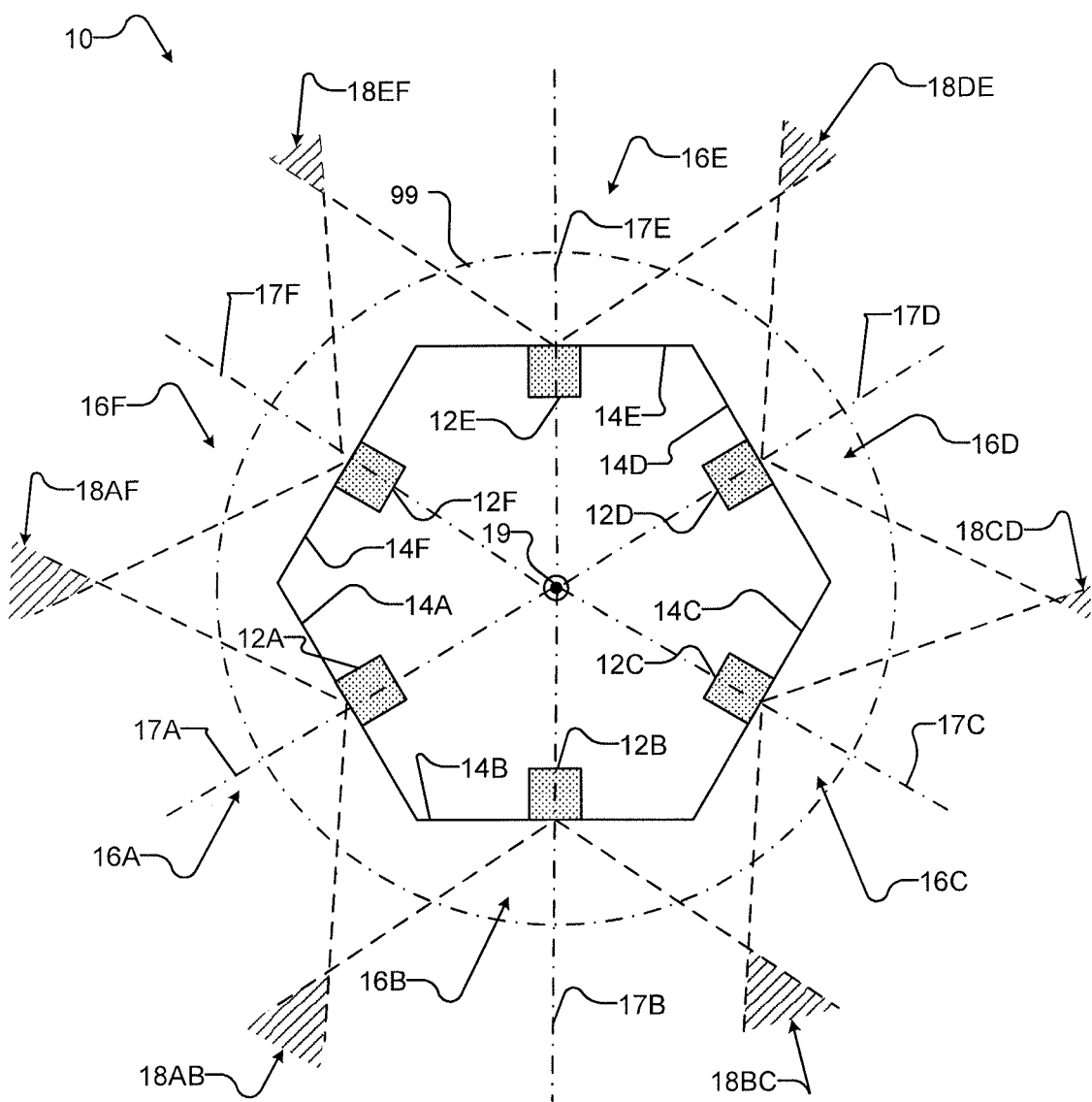
FIG. 1B is a plan schematic view of an embodiment of the FIG. 1A apparatus for multi-sensor image capture.

FIG. 1A shows a perspective view of an example multi-sensor system 10, and FIG. 1B shows a plan (e.g. top-down) schematic view of the same system 10. The FIG. 1A and 1B system 10 comprises a plurality of image sensors 12A, 12B, 12C, 12D, 12E, 12F (collectively and individually "sensors 12"). As will be appreciated by those skilled in the art, each sensor 12 may also comprise corresponding image sensor optics (e.g. lenses, filters, mirrors, and/or the like) and electronics (e.g. analog and digital signal conditioning and/or processing electronics and/or the like) which not expressly shown or enumerated in FIG. 1A or 1B. Each sensor 12 is oriented toward a corresponding face 14A, 14B, 14C, 14D, 14E, 14F (collectively and individually "faces 14") and has a corresponding field of view 16A, 16B, 16C, 16D, 16E, 16F (collectively and individually "fields of view 16"). Each sensor 12 (and its associated optics) have an optical axis 17A, 17B, 17C, 17D, 17E, 17F (collectively optical axes 17) and optical axes 17 of all of sensors 12 intersect at a centroid 19.

Among the plurality of sensors 12 in system 10 or any other plurality of sensors described herein, a pair of "adjacent sensors" may comprise a pair of sensors 12 whose optical axes 17 intersect one another at a centroid 19 which is located at the origin of a notional sphere (not shown in FIG. 1A or 1B). In the case of sensors 12 in the FIG. 1B system 10, the optical axes 17 of adjacent sensors 12 also intersect a great circle 99 of the notional sphere at angularly adjacent locations on the great circle 99, although this is not a general requirement of an adjacent pair of sensors. Another way of thinking about a pair of adjacent sensors is in terms of the field of view of each sensor. The field of view of each sensor (e.g. the field of view 16 of each sensor 12) may be considered to cover a spherical sector of a world sphere with infinite radius, where the typically rectangular shape of the image sensor approximates the circular boundary of the optics and the corresponding spherical sector. A pair of image sensors having optical axes that intersect at a centroid and having corresponding spherical sectors that overlap or nearly overlap (i.e. without an intervening spherical sector of an intervening image sensor) may be considered to be an adjacent pair of image sensors. In general, an adjacent pair of sensors may comprise any pair of sensors which provide individual images that are combined in the combined image to provide a boundary between the image data from a first one of the pair of sensors and image data from a second one of the sensors.

In the illustrated embodiment of FIGS. 1A and 1B, system 10 comprises adjacent pairs of sensors 12A and 12B, 12B and 12C, 12C and 12D, 12D and 12E, 12E and 12F and 12F and 12A. In the illustrated embodiment of FIGS. 1A and 1B, fields of view 16 of adjacent pairs of sensors 12 overlap in overlap regions 18AB, 18BC, 18CD, 18DE, 18EF, 18AF (collectively and individually "overlap regions 18"). Portions of a scene located within overlap regions 18 will be imaged by multiple image sensors 12—i.e. by both sensors 12 of a corresponding adjacent pair of image sensors 12. In general, however, it is not necessary for the fields of view 16 of an adjacent pair of image sensors 12 to overlap one another. If the fields of view 16 of a pair of image sensors 12 are close to one another (e.g. nearly overlapping) and there is no intervening field of view 16 of an intervening image sensor 12, then the pair of sensors 12 may be considered to be an adjacent pair of sensors 12.

Data from the images captured by individual image sensors 12 may be combined to provide a combined image comprising image data from the plurality of image sensors 12. In general, combining the image data from a plurality of individual image sensors 12 comprises transforming the image data to undo the original projection of the 3D scene onto the individual image sensors 12 and re-projecting the image data from each individual image sensor 12 into a combined image space—typically, although not necessarily, a combined planar image space. In some embodiments, combined images may be generated from as few as a single pair of adjacent image sensors 12. Each combined image may comprise first pixels from a first individual image captured by a first one of a pair of adjacent image sensors, second pixels from a second individual image captured by a second one of the pair of adjacent image sensors and a boundary between the first pixels and second pixels.

The example system 10 of the FIG. 1A and 1B embodiment is hexagonal arrangement of six sensors 12, in which the optical axes 17 of adjacent sensors 12 are offset from one another by angles of 60° about centroid 19. As will be appreciated, other arrangements of sensors 12 and their optical axes 17 are possible. For example, in some embodiments sensors 12 and optical axes 17 may be in a rectangular arrangement where optical axes 17 are offset by 90° or 45° about centroid 19.

Figure 1C:
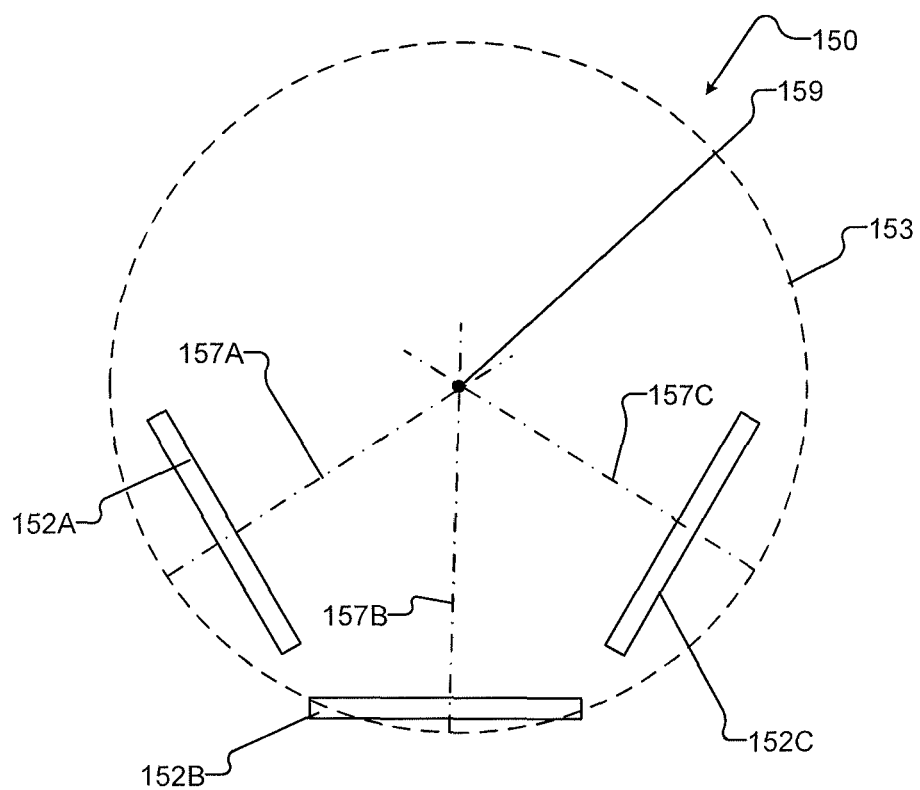
FIG. 1C is a schematic view of another example apparatus for multi-sensor image capture according to a particular embodiment.

In the example embodiment of FIG. 1A and 1B, sensors 12 are adjacent to one another along a single notional great circle 99 of a single notional sphere; sensors 12 are arranged in a ring which corresponds to great circle 99. In some embodiments, sensors 12 may be adjacent along a plurality of great circles. FIG. 1C shows a schematic depiction of another example system 150 for multi-sensor image capture according to a particular embodiment wherein sensors are arranged in a dodecahedral arrangement. System 150 comprises plurality (three) sensors 152A, 152B, 152C (collectively and individually, sensors 152). Each of sensors 152 has its corresponding optical axis 157A, 157B, 157C, 117D, 117E, 117F (collectively and individually axes 157) which intersect one another at centroid 159. Adjacent pairs of sensors 152A,152B and 152B, 152C are angularly adjacent to one another on a notional great circle 153 of a notional sphere (not expressly shown in FIG. 1C) having a center at centroid 159. System 150 differs from the system of FIGS. 1A, 1B in that in the FIG. 1C system 150, imaging sensors 152 are oriented to face toward centroid 159 (as opposed to facing away from centroid 19). It will be appreciated that the other systems described herein could be constructed so that their image sensors were oriented to face their respective centroids.

It will be appreciated by those skilled in the art that there are many other arrangements for providing a plurality of image sensors in a manner that will permit the generation of combined images, where each combined image comprises a combination of image data from a plurality of individual image sensors which involves transforming the image data to undo the original projection of the 3D scene onto the individual image sensors and re-projecting the image data from each individual image sensor into a combined image space.

In some embodiments, any two or more sensors may be arranged in any suitable arrangement with fields of view exhibiting overlap regions between adjacent pairs of sensors, although overlap between the fields of view of adjacent pairs of sensors is not a requirement. As discussed above, in general, an adjacent pair of sensors may comprise any pair of sensors which are combined in a combined image to provide a boundary between the image data from a first one of the pair of sensors and image data from a second one of the sensors.

In some embodiments, pairs of adjacent image sensors may be used in a different configuration where they do not share a centroid and do not image a world sphere, but instead are used to leverage parallax disparity (due to translational offset) to extract depth information within an overlapping region of their fields of view. Such configurations may involve pairs of adjacent image sensors having parallel or near parallel optical axes. While the image capturing techniques described herein may be used in such embodiments due to the overlapping fields of view, the captured image data from the pair of adjacent sensors need not be combined into a combined image by a machine or computer. Instead, traditional stereoscopic 3D playback involves projecting images from one sensor to each eye, so that the combined 3D image may be created inside the brain of a human viewer.

FIG. 3A is a schematic view of a combined image 30 made up of image data captured by an exemplary arrangement comprising a plurality of individual global-shutter image sensors. FIG. 3B is a schematic view of a combined image 40 comprising image data captured by an exemplary arrangement comprising a plurality of individual rolling-shutter image sensors. A comparison of FIGS. 3A and 3B illustrates the type of rolling-shutter imaging artifacts that may occur in applications where individual images from individual rolling shutter sensors are combined to provide a combined image. Combined image 30 comprises a plurality of individual images 32A, 32B, 32C, 32D (collectively and individually "images 32" or "global-shutter images 32") captured by global shutter sensors (not shown) having overlapping fields of view. Combined image 40 comprises a plurality of individual images 42A, 42B, 42C, 42D (collectively and individually "images 42" or "rolling-shutter images 42") captured by rolling shutter sensors (not shown) having overlapping fields of view.

Adjacent pairs (32A, 32B; 32C, 32D; 32A, 32C; 32B, 32D) of individual global-shutter images 32 have corresponding overlap regions 34AB, 34CD, 34AC, 34BD and four of global-shutter images 32 overlap in region 34ABCD. These overlap regions may be referred to collectively and individually as "overlap regions 34". Boundaries 35AB, 35CD 35AC, 35BD (collectively and individual boundaries 35) between adjacent pairs of individual global-shutter images 32 are typically located within corresponding overlap regions 34AB, 34CD, 34AC, 34BD, although this is not always necessary. Adjacent pairs (42A, 42B; 42C, 42D; 42A, 42C; 42B, 42D) of individual rolling-shutter images 42 have corresponding overlap regions 44AB, 44CD, 44AC, 44BD and four of rolling-shutter images 42 overlap in region 44ABCD. These overlap regions may be referred to collectively and individually as "overlap regions 44". Boundaries 45AB, 45CD 45AC, 45BD (collectively and individual boundaries 45) between adjacent pairs of individual rolling-shutter images 42 are typically located within corresponding overlap regions 44AB, 44CD, 44AC, 44BD, although this is not always necessary. It will be appreciated that FIGS. 3A and 3B are schematic depictions showing combined images 30, 40 and corresponding arrangements of individual images 32, 42. Combined images 30, 40 are shown, for the sake of convenience and ease of explanation, as a planar grid of overlapping individual images 32, 42. As discussed above, individual images 32, 42 need not necessarily physically overlap, and are not necessarily arranged in a plane and/or a rectangular array; combined images 30, 40 may correspond to any physical arrangement of individual sensors, where individual images 32, 42 corresponding to individual sensors are combined in the manner discussed above to provide combined images 30, 40.

Global-shutter combined image 30 is generated from individual global-shutter images 32A, 32B, 32C, 32D by a suitable image processor (not shown in FIG. 3A) using a process for combining together overlapping and/or otherwise adjacent individual images. As is known in the art of image processing and discussed above, the combination of individual images 32 to generate combined image 30 involves transforming individual image data to undo the original projection of the 3D scene onto the individual image sensors and re-projecting the image data from each individual image sensor into a combined image space. Individual global-shutter images 32 shown in the schematic FIG. 3A depiction may be considered to be the re-projected individual global-shutter images 32 into the combined space of combined image 30.

It is assumed for the purposes of discussing FIG. 3A that the individual global-shutter sensors corresponding to individual global-shutter images 32 are triggered at substantially the same time (typically using suitable electrical signals from a processor to trigger the sensors). Because the sensors which capture global-shutter images 32 are global-shutter sensors, corresponding pixels in overlap regions 34 may undergo integration over substantially the same period of time and consequently produce image data which may be substantially in registration. For example, pixels 38A, 38C are respectively part of individual images 32A and 32C and are located in overlap region 34AC. Since pixels 38A, 38C undergo integration over substantially the same period of time in a global-shutter system, pixels 38A, 38C produce similar image data, even when the image sensors and the scene are moving relative to one another. Since pixels 38A, 38C capture similar image data, pixels 38A, 38C may be said to be in registration. After capturing individual images 32, the image combination process may recognize that pixels 38A, 38C are in registration and may use such registration in the image combination process. In the case of global-shutter images 32, mis-registration between individual images 32A, 32B, 32C, 32D of adjacent pairs of sensors in overlap regions 34 is relatively minor, and the resultant combined image 30 appears consistent across the boundaries 35 between individual images 32. Such registration of individual images 32A, 32B, 32C, 32D remains the case if the corresponding sensors are moving (relative to the scene being imaged) in movement direction 24 during integration and/or readout of image data.

Rolling-shutter combined image 40 is generated from individual rolling-shutter images 42A, 42B, 42C, 42D by a suitable image processor (not shown in FIG. 3B) using a process for combining together overlapping and/or otherwise adjacent individual images. As is known in the art of image processing and discussed above, the combination of individual images 42 to generate combined image 40 involves transforming individual image data to undo the original projection of the 3D scene onto the individual image sensors and re-projecting the image data from each individual image sensor into a combined image space. Individual rolling-shutter images 42 shown in the schematic FIG. 3B depiction may be considered to be the re-projected individual rolling-shutter images 42 into the combined space of combined image 40.

It is assumed for the purposes of discussing FIG. 3B that the individual rolling-shutter sensors corresponding to individual rolling-shutter images 32 (or corresponding portions of such individual rolling-shutter sensors) are triggered at substantially the same times (typically using suitable electrical signals from a processor to trigger the sensors) and that these sensors are moving in movement direction 24 during image capture and readout. Because the sensors which capture rolling-shutter images 42 are rolling-shutter sensors, the various pixels in individual rolling-shutter images 42 undergo integration at different times. Thus, as shown in FIG. 2C and explained above, each individual rolling-shutter image 42 experiences some skew or other distortion. This skew or distortion may in turn make it more difficult to combine the overlapping or otherwise adjacent individual rolling shutter images 42 to generate combined image 40, as pixels in overlap regions 44 undergo integration at considerably different times and may not be well registered. For example, corresponding pixels 48A, 48C (of individual rolling-shutter images 42A, 42C, respectively) may be integrated at different times. Such different integration times would be the case, for example, if the rolling-shutter sensors corresponding to individual rolling-shutter images 42 undergo integration and readout with a pattern similar to that of FIG. 2A. With such an integration and read out pattern, pixel 48C will undergo integration and be read out significantly earlier than pixel 48A.

Consider example pixels 48A, 48C, which are respectively parts of individual rolling-shutter images 42A, 42C in overlap region 44AC. Assuming the integration and readout pattern shown in FIG. 2A, pixels 48A, 48C are integrated at different times in accordance with the rolling shutter technique. In addition, the relative movement between the sensors and the scene in movement direction 24 causes pixels 48A, 48C to capture different image data at their different integration times. When the image data captured by pixels 48A, 48C (and similar pixels in overlap region 44AC or individual images 42A, 42C) is different (i.e. mis-registered), it can be difficult to combine individual images 42A, 42C to generate combined image 40.

In circumstances where the integration and read out pattern is similar to that of FIG. 2A (i.e. along rows (axis 23) and then, at the completion of each row, jumping (along column axis 25) to the beginning of a next row), the mis-registration effect may be more severe in overlap regions 44AC, 44BD. This relatively severe mis-registration in overlap regions 44AC, 44BD and 44ABCD may be due to the fact that corresponding pixels in those regions have different positions along column axis 25 (FIG. 2A). Consequently, the delay between integration of pixel 48A of image 42A and integration the corresponding pixel 48C of image 42C may be on the order of the time taken to integrate and read out many rows of pixels. This mis-registration may be less severe for pixels in overlap regions 44AB, 44CD, because these pixels have different positions along row axis 23 (FIG. 2A), so the delay between integration of a pixel of sensor 72A and a corresponding pixel of sensor 72B is on the order of the time taken to integrate and read out one row of pixels. Despite the relatively low severity of the mis-registration of corresponding pixels in overlap regions 44AB, 44CD (as compared to overlap regions 44AC, 44BD), for sufficiently-fast movement in movement direction 24, even the more limited effect seen in overlap regions 44AB, 44CD may be noticeable.

Figure 4:
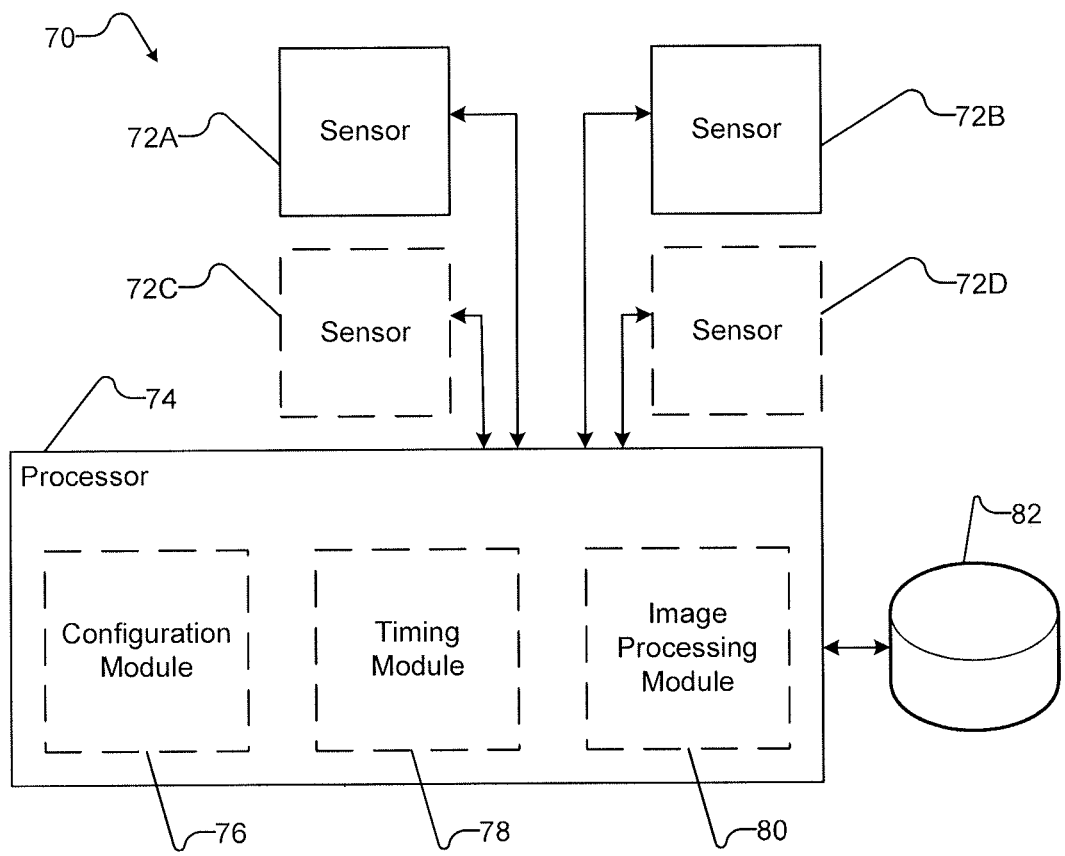
FIG. 4 is a schematic diagram of an example system for multi-sensor image capture and combining the plurality of images into a combined image according to a particular embodiment of the present disclosure.

FIG. 4 is a schematic diagram of a multi-sensor image capture system 70 according to an example embodiment. System 70 captures image data with a plurality of image sensors 72A, 72B, and (optionally) further image sensors 72C, 72D, etc. (collectively and individually, "sensors 72"). Sensors 72 may comprise any suitable image sensors and may comprise CMOS sensing elements, CCD sensing elements and/or other sensing elements (not expressly shown). Sensors 72 may comprise rolling-shutter image sensors similar to any of the other rolling-shutter sensors discussed herein. Sensors 72 are in communication with processor 74. Processor 74 comprises a configuration module 76 for configuring scanning directions of sensors 72, a timing module 78 for coordinating the integration and readout times of sensors 72, and an image processing module 80. Processor 74 is in communication with a data store 82 for storing image data and/or other data processed by processor 74. In the illustrated embodiment, processor 74 is shown as a component of imaging system 70, but processor 74 need not be an embedded processor. Processor 74 and/or functional portions thereof may be implemented by discrete components (e.g. a computer, graphics processor and/or the like) implemented separately from the camera housing sensors 72. Similarly, configuration module 76, timing module 78 and image processing module 80 are shown in FIG. 4 as being within processor 74. In some embodiments, processor 74 may access additional electronic components (e.g. external clock oscillators, signal conditioning circuitry, computer(s), graphics processor(s) and/or the like) to implement any of the functionalities of configuration module 76, timing module 78 and/or image processing module 80.

In the illustrated embodiment, configuration module 76 configures the integration and readout scanning directions of rolling-shutter image sensors 72, so that, for each pair of adjacent sensors 72, the pair of adjacent sensors either: integrates and reads out in directions toward a boundary between corresponding image data in the combined image; or integrates and reads out in directions away from the boundary between corresponding image data in the combined image. For example, where a pair of adjacent sensors 72 has an overlap region (e.g. the boundary between the image data of the pair of adjacent sensors 72 in the combined image is located in the overlap region), each sensor 72 in the pair of adjacent sensors 72 may be configured (by configuration module 76) to integrate and read out image data in a scanning direction toward the pair's corresponding overlap region, or away from the pair's corresponding overlap region, as described in greater detail below in connection with FIGS. 5 and 6.

Timing module 78 configures the integration and read out timing of sensors 72.

Image processing module 80 receives image data captured by sensors 72 and processes that image data. Such processing may comprise, for example, storing the received image data in data store 82, combining individual images (e.g. individual rolling-shutter images 42) into a combined image (e.g. image 40), and/or any other suitable processing.

Figure 5:
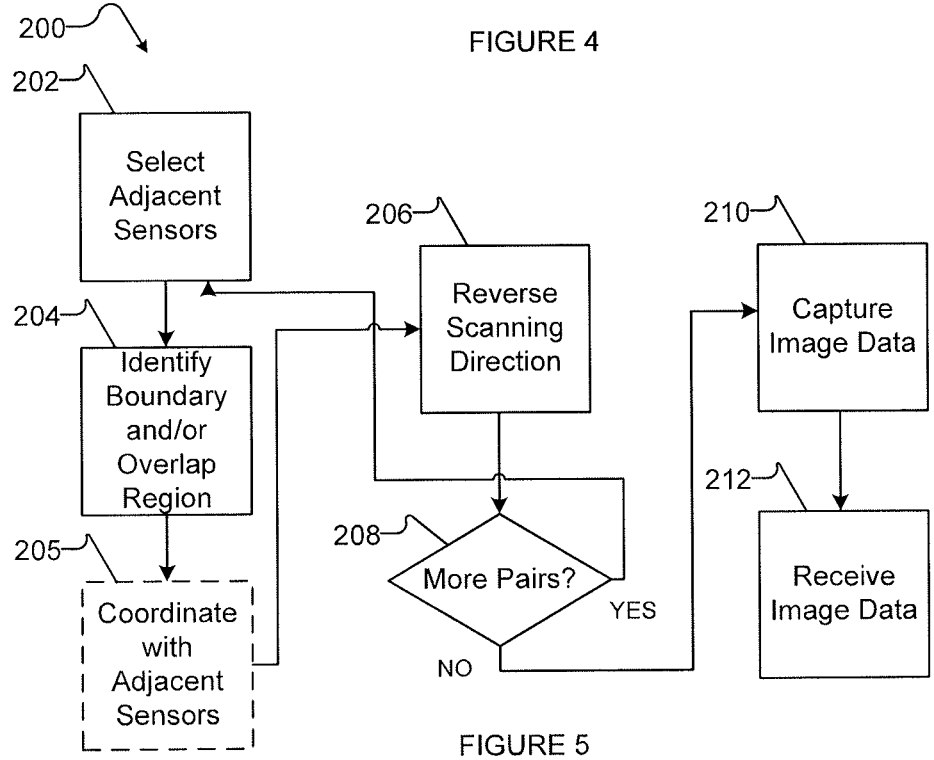
FIG. 5 is a flowchart of an example method for multi-sensor image capture and combining the plurality of images into a combine image according to a particular embodiment of the present disclosure, which may be implemented by the FIG. 4 system.
Figure 6:
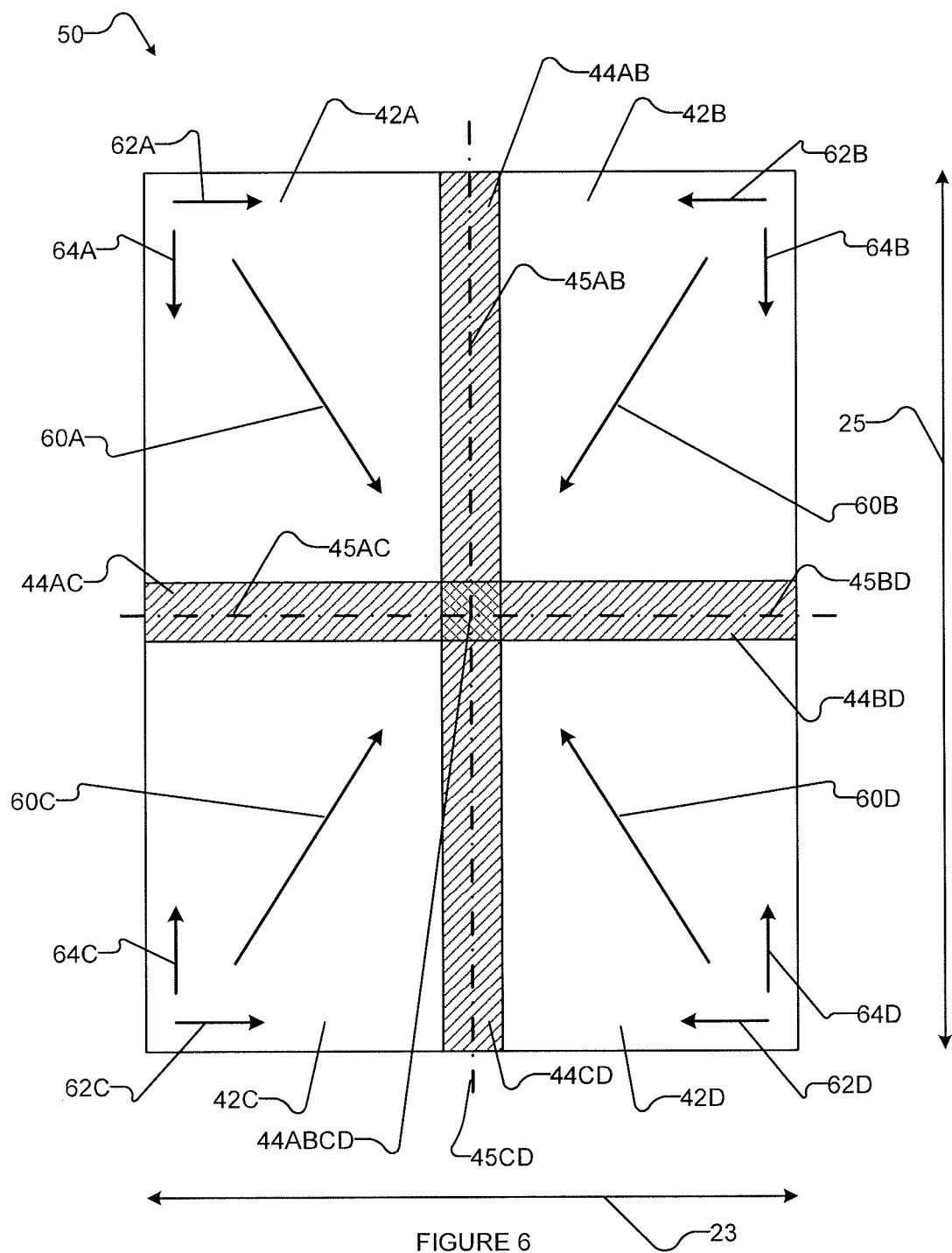
FIG. 6 is a schematic view of a combined image comprising image data captured by an exemplary arrangement of a plurality of individual rolling-shutter image sensors configured in accordance with the FIG. 5 method according to a particular embodiment of this disclosure.

FIG. 5 shows an example method 200 for configuration of an imaging system (e.g. imaging system 70 of FIG. 4) according to a particular embodiment. In some embodiments, method 200 may be performed during manufacture or set-up of the imaging system. In some embodiments, method 200 may be performed by a suitably configured processor (e.g. 74 of the FIG. 4 imaging system 70). FIG. 6 shows a schematic diagram of an example combined image 50 produced by an imaging system configured according to method 200. The imaging system that generates combined image 50 may be similar to imaging system 70 (FIG. 4) and may comprises sensors located and/or oriented in a manner similar to that discussed above in connection with FIG. 3B (e.g. to generate individual rolling shutter images 42 having overlap regions 44, as described above with respect to FIG. 3B. Individual rolling shutter-images 42 shown in combined image 50 (FIG. 6) may be captured by rolling-shutter sensors 72 shown in system 70 (FIG. 4) with a one-to-one corresponding between rolling-shutter sensors 72 and corresponding rolling-shutter images 42.

In some embodiments, prior to performing method 200, sensors 72 may be configured to undergo integration and read out using a row-column scanning pattern which involves scanning a row along row axis 23 and, subsequently, advancing to the next row along column axis 25, as described above with respect to FIG. 2A. For example, each sensor 72 may initially be generated using an integration and readout pattern which scans in a row scanning direction 62A (shown as left-to-right in FIG. 6) along row axis 23 and in column-scanning direction 64A (shown as top-to-bottom in FIG. 6) along column axis 25. This is not necessary, however. In some embodiments (e.g. where method 200 is performed during manufacture or set-up of the corresponding imaging system), the integration and read-out patterns of sensors 72 may be initially configured as described below.

In the example embodiment depicted in FIG. 6, by the time that method 200 is complete, sensors 72 corresponding to images 42 are configured to scan in the directions shown in FIG. 6. That is, sensor 72 corresponding to image 42A is configured to scan in row scanning direction 62A and column scanning direction 64A by scanning in row scanning direction 62A along each row and then subsequently jumping to the next row along column scanning direction 64A. This scanning pattern for the sensor 72 corresponding to image 42A is unchanged from its initial configuration described above. At the conclusion of method 200, the sensor 72 corresponding to image 42B is configured to scan each row in a reversed row scanning direction 62B before subsequently jumping to the beginning of a next row in column scanning direction 64B (i.e. in the FIG. 6 view, the sensor 72 corresponding to image 42B scans right-to-left by the conclusion of method 200). In this manner, the adjacent pair of sensors 72 corresponding to images 42A and 42B are both configured to scan along row axis 23 toward overlap region 44AB (and boundary 45AB between images 42A, 42B). At the conclusion of method 200, the sensor 72 corresponding to image 42C is configured to scan each row in row scanning direction 62C before subsequently jumping to the beginning of a next row in a reversed column scanning direction 64C (i.e. in the FIG. 6 view, the sensor 72 corresponding to image 42C scans bottom-to-top by the conclusion of method 200). In this manner, the adjacent pair of sensors 72 corresponding to images 42A and 42C are both configured to scan along column axis 25 toward overlap region 44AC (and boundary 45AC between images 42A, 42C). At the conclusion of method 200, the sensor 72 corresponding to image 42D is configured to scan each row in a reversed row scanning direction 62D before subsequently jumping to the beginning of a next row in a reversed column scanning direction 64D (i.e. in the FIG. 6 view, the sensor 72 corresponding to image 42D scans right-to-left and bottom-to-top by the conclusion of method 200). In this manner, the sensor 72 corresponding to image 42D is configured to scan toward overlap regions 44BD and 44CD (and boundaries 45DB and 45CD), as do the sensors 72 corresponding to images 42B and 42C, respectively.

Row scanning directions 62A, 62B, 62C, 62D (collectively and individually "scanning directions 62") and column scanning directions 64A, 64B, 64C, 64D (collectively and individually "scanning directions 64") may be logically combined and referred to as scanning directions 60A, 60B, 60C, and 60D, respectively (collectively and individually "scanning directions 60"). That is, row scanning direction 62A and column scanning direction 64A combine to form scanning direction 60A. It can be observed that, by coordinating the scanning directions of adjacent sensors 72, each sensor 72 has a corresponding scanning direction 60 oriented toward overlap region 44ABCD, so that the last pixel integrated and read out by each sensor 72 lies in overlap region 44ABCD.

Returning to FIG. 5, method 200 starts in block 202 which involves selecting a pair of adjacent sensors 72 via configuration module 76. As discussed above, a pair of adjacent sensors 72 may comprise a pair of sensors 72 whose optical axes intersect one another at a centroid which is located at the origin of a notional sphere and whose optical axes intersect a great circle of the notional sphere at angularly adjacent locations on the great circle, although this is not a general requirement of an adjacent pair of sensors 72. In general, an adjacent pair of sensors 72 may comprise any pair of sensors 72 which provide individual images that are combined in the combined image to provide a boundary between the image data from a first one of the pair of sensors 72 and image data from a second one of the sensors 72. In some embodiments, only pairs for which at least one sensor 72 has not yet been configured by configuration module 76 are selected (thereby avoiding re-configuring previously-configured sensors).

In some embodiments, if no previous pair of adjacent sensors 72 has been selected, configuration module 76 arbitrarily selects a first pair of adjacent sensors 72 (e.g. randomly, based on an identifier, based on a logical position relative to other sensors 72, etc.). Each subsequent adjacent pair of sensors 72 is selected (after method 200 passes through block 208) by first selecting a sensor 72 which was part of a previously-selected pair and then selected an adjacent sensor 72 which has not been part of a previously-selected pair.

For instance, in the example embodiment of FIG. 6, block 202 may involve selecting, for example, the adjacent pair of sensors 72 corresponding to individual images 42A and 42B.

Block 204 involves identifying a boundary and/or an overlap region corresponding to the block 202 selected pair of adjacent sensors 72. For instance, in the example embodiment of FIG. 6, block 204 may involve selecting boundary 45AB and/or overlap region 44AB, which corresponds to the overlap region between adjacent sensors 72 corresponding to individual images 42A and 42B.

Optionally, method 200 may comprise block 205. Block 205 involves determining scanning direction constraints based on non-selected adjacent sensors 72. In some embodiments, block 205 involves identifying scanning directions (e.g. scanning directions 60) in which the block 202 selected sensors 72 may not be configured based on the scanning directions of adjacent (and non-selected) sensors 72 which have previously been configured by configuration module 76.

For instance, in the example embodiment of FIG. 6, suppose that sensors 72 corresponding to individual images 42A and 42C have each previously been configured with scanning directions 60A and 60C, as shown. However, suppose that the sensor 72 corresponding to individual image 42D has not yet been configured, and currently has a scanning direction equivalent to scanning direction 60A (i.e. the default scanning direction in this example embodiment). If the sensors 72 corresponding to images 42B and 42D are the block 202 selected pair, then block 205 may involve identifying that the adjacent (non-selected) sensor 72 corresponding to individual image 42C is configured with scanning direction 60C and further identifying that the sensor 72 corresponding to individual image 42D should reverse its scanning direction in row axis 23 and/or column axis 25 to achieve the desired scanning configuration.

Block 206 involves reversing the scanning direction of one or more selected sensors 72 along one or more axes 23, 25. Configuration module 76 may reverse a scanning direction of one of the block 202 selected sensors 72 along an axis 23, 25 so that both of the selected sensors 72 capture image data by scanning toward their corresponding overlap region 44 and/or boundary 45 along the axis 23, 25, or so that both of the selected sensors 72 capture image data by scanning away from their corresponding overlap region 44 and/or boundary 45 along the axis 23, 25. For instance, in the example embodiment of FIG. 6, where the selected pair of sensors 72 corresponds to images 42A, 42B, configuration module 76 may configure the sensor 72 corresponding to image 42B so that row scanning direction 62B is reversed along row axis 23, causing the sensor 72 corresponding to image 42B to scan toward overlap region 44AB and/or boundary 45AB along row axis 23. Sensor 72A does not require reversal, as it is already configured to scan toward overlap region 44AB and boundary 45AB along row axis 23.

As a part of block 206, configuration module 76 may configure the scanning directions of sensors 72 along one or more axes 23, 25. In some embodiments, configuration module 76 only configures the scanning directions along one axis 23, 25. For instance, configuration module 76 may only adjust scanning directions along the axis where adjacent pixels have the most delay during pixel integration and readout. For example, with the integration and read out pattern shown in FIG. 2A, column-axis-adjacent pixels (i.e. pixels adjacent to one another along column axis 25) will have a delay on the order of the pixel clock period times the number of pixels in a row, whereas row-axis-adjacent pixels (i.e. pixels adjacent to one another along row axis 23) will have a delay of only a single pixel clock period. Accordingly, in some such embodiments, as part of block 206, configuration module 76 may configure the scanning direction along column axis 25, but, since the delay between scanning a pixel at the beginning of a row vs. a pixel at the end of the same row may be fairly small, may not adjust scanning directions along row axis 23. In some embodiments, as part of block 206, configuration module 76 may configure the scanning direction along row axis 23, but not along column axis 25.

In some embodiments, configuration module 76 reverses scanning directions along row axis 23 and column axis 25. Of course, some pairs of sensors 72 do not require reversal along multiple axes 23, 25, as is the case for the sensors 72 corresponding to individual images 42A and 42B in the FIG. 6 example; rather, configuration module 76 may reverse scanning directions at various times along neither, one, or both of axes 23, 25, as appropriate. FIG. 6 provides an example of an embodiment where configuration module 76 has reversed scanning direction 62B of the sensor 72 corresponding to image 42B along row axis 23, reversed scanning direction 64C of the sensor 72 corresponding to image 42C along column axis 25 and reversed scanning directions 62D, 64D of the sensor 72 corresponding to image 42D along both axes 23, 25.

In some embodiments, blocks 202, 204, and/or 205 may be omitted. For example, one of more of blocks 202, 204, 205, or other steps which provide an identification of overlap regions and/or scanning directions, may be performed during manufacture or set-up of the corresponding imaging system and/or by a user if the corresponding imaging system. The user may provide the results of these steps to processor 74, which may proceed (via configuration module 76) to configure the scanning directions of sensors 72 at block 206 as described above. In some embodiments, configuration module 76 receives an identification of one or more sensors 72 and also receives one or more desired scanning directions for each identified sensor 72. Configuration module 76 then configures the identified sensors 72 to scan in the desired scanning directions.

Block 208 involves configuration module 76 determining whether there are any adjacent pairs of sensors 72 remaining which include an unexamined sensor 72. If so (block 208 YES branch), method 200 returns to block 202 and repeats the above-described process with a different pair of adjacent sensors 72. Otherwise (if all sensors 72 have been examined and, if appropriate, configured with an appropriate scanning direction) then method 200 continues (via block 208 NO branch) to block 210.

Block 210 involves causing sensors 72 to capture image data. Timing module 78 provides one or more instructions to sensors 72 and coordinates the image acquisition times of sensors 72 so that adjacent pairs of sensors 72 are triggered to begin image acquisition at generally the same time. Block 210 may also comprise using a common pixel clock between adjacent pairs of image sensors 72 to help ensure that corresponding pixels are read at substantially the same time. For instance, in the example embodiment of FIG. 6, each sensor 72 is substantially aligned with its adjacent sensors 72 and comprises substantially the same number of pixels, so timing module 78 may drive sensors 72 to commence integration at substantially the same time and with substantially the same pixel clock frequency.

Other embodiments may involve different frequencies and/or integration start times between adjacent pairs of sensors 72. In some embodiments where sensors 72 have different numbers of pixels, timing module 78 may drive sensors 72 to capture image data with different frequencies (i.e. the rate at which individual pixels of a lower-resolution image sensor 72 are read may be slower relative to a higher-resolution image sensor 72). In some embodiments where sensors 72 are not aligned (e.g. where the first row of sensor 72B does not align with the first row of sensor 72A along column axis 25), timing module 78 may drive sensors 72 to commence integration at different times, so that corresponding rows (or columns) of adjacent sensors 72 are captured at relatively proximate times. In some embodiments where different sensors have different angles of view (e.g. where a sensor 72 has a narrow field of view which overlaps a portion of the field of view of a relatively wider-angled sensor 72), timing module 78 may drive some sensors 72 to have different integration start times and/or integration times relative to adjacent sensors 72 to account for the relative areas imaged by the sensors 72 (even if the sensors 72 have the same resolution and/or are aligned).

Block 212 involves receiving the individual image data from sensors 72 at image processing module 80 and processing that individual image data to generate a combined image 40. Image processing module 80 may comprise, for example, storing the received image data in data store 82, combining overlapping or otherwise adjacent individual images (e.g. images 42A, 42B, 42C, 42D) into a combined image (e.g. image 40), transmitting image data and/or data derived therefrom over a communication link, displaying the image data to a user at a display, and/or any other suitable processing.

Some of the above-described examples have used four-sensor embodiments for the purpose of illustrating a variety of relationships between adjacent pairs of sensors. This disclosure is not limited to four-sensor embodiments. Any suitable number of sensors may be used, so long as the number of adjacent sensors comprises at least one pair of adjacent sensors which provide individual images that are combined in the combined image to provide a boundary between the image data from a first one of the pair of sensors and image data from a second one of the sensors.

FIGS. 7A, 7B, 7C, 7D (collectively and individually FIG. 7) show example techniques by which configuration module 76 may configure the row scanning directions 312A, 312B (collectively and individually row scanning directions 312) and column scanning directions 314A, 314B (collectively and individually column scanning directions 314) of an adjacent pair of sensors 72 corresponding to individual images 302, 304 which overlap in region 306 and have a boundary (not expressly shown in FIG. 7) in overlap region 306.

In FIG. 7A, configuration module 76 does not reverse either row scanning direction 312A or column scanning direction 314A of the sensor 72 corresponding to individual image 302, nor does configuration module 76 reverse row scanning direction 312B of the sensor 72 corresponding to individual image 304. In FIG. 7A, configuration module 76 does reverse column scanning direction 314B of the sensor 72 corresponding to image 304, thereby causing both of the sensors 72 corresponding to images 302 and 304 to scan toward overlap region 306 along column axis 25. In FIG. 7B, configuration module 76 reverses only column scanning direction 314A of the sensor 72 corresponding to image 302 and no other scanning directions 312, 314. In FIG. 7C, configuration module 76 reverses row scanning directions 312A and 312B as well as column scanning direction 314A of the sensor 72 corresponding to image 302. In FIG. 7D, configuration module 76 reverses row scanning directions 312A and 312B as well as column scanning direction 314B of the sensor 72 corresponding to image 304.

In each of the FIG. 7 example embodiments, both of the adjacent pair of sensors 72 corresponding to individual images 302 and 304 are configured to scan toward (or away from) their corresponding overlap region 306 and/or their corresponding boundaries. The basic patterns of FIG. 7 can be combined in embodiments with more than one pair of adjacent sensors 72; for example, the sensors 72 corresponding to images 42A and 42C of FIG. 6 are arranged in the pattern of FIG. 7A, and sensors 72 corresponding to images 42B and 42D are arranged in the pattern of FIG. 7D.

Although FIG. 7 shows sensors which are adjacent along column axis 25, analogous patterns may be used for sensors which are adjacent along row axis 23. The skilled reader need only swap axes 23 and 25 to verify this for himself or herself FIG. 6 shows an example where the scanning directions 60 or more than two sensors 72 are oriented toward a common overlap region 44ABCD. In some embodiments, scanning directions 60 are oriented away from common overlap region 44ABCD. In some embodiments, there are multiple overlap regions with more than two overlapping sensors, and different ones of such overlap regions may have different orientations of scanning directions 60.

Figure 8:
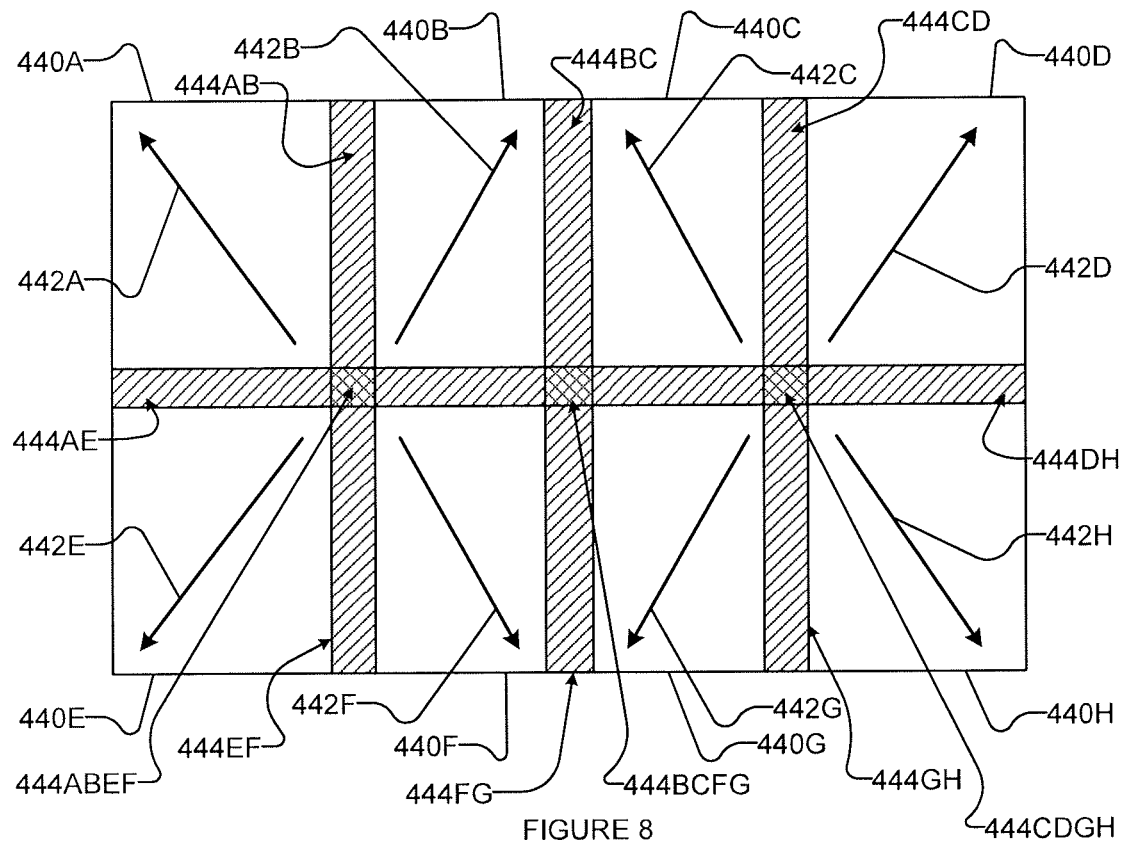
FIG. 8 is a schematic view of a combined image comprising image data captured by an exemplary arrangement of eight individual rolling-shutter image sensors according to an embodiment of this disclosure which illustrates reversal of scanning directions along multiple axes.

For example, in FIG. 8, sensors 72 corresponding to individual images 440A, 440B, 440E, and 440F have a common overlap region 444ABEF, and a sensor 72 corresponding to each image 440A, 440B, 440E, and 440F is associated with a scanning direction 442A, 442B, 442E, 442F, respectively, which is oriented away from overlap region 444ABEF along both axes 23, 25. Sensors 72 corresponding to images 440C, 440D, 440G, and 440H similarly have a common overlap region 444CDGH, and a sensor 72 corresponding to each image 440C, 440D, 440G, and 440H is associated with a scanning direction 442C, 442D, 442G, 442H, respectively, which is oriented away from overlap region 444CDGH along both axes 23, 25. However, overlap region 444BCFG has a different pattern; surrounding sensors 72 corresponding to images 440B, 440C, 440F, 440G have scanning directions 442B, 442C, 442F, 442G oriented toward overlap region 444BCFG along row axis 23 and away from overlap region 444BCFG along column axis 25. Such heterogeneously-oriented embodiments also fall within the scope of the present disclosure.

Figure 9:
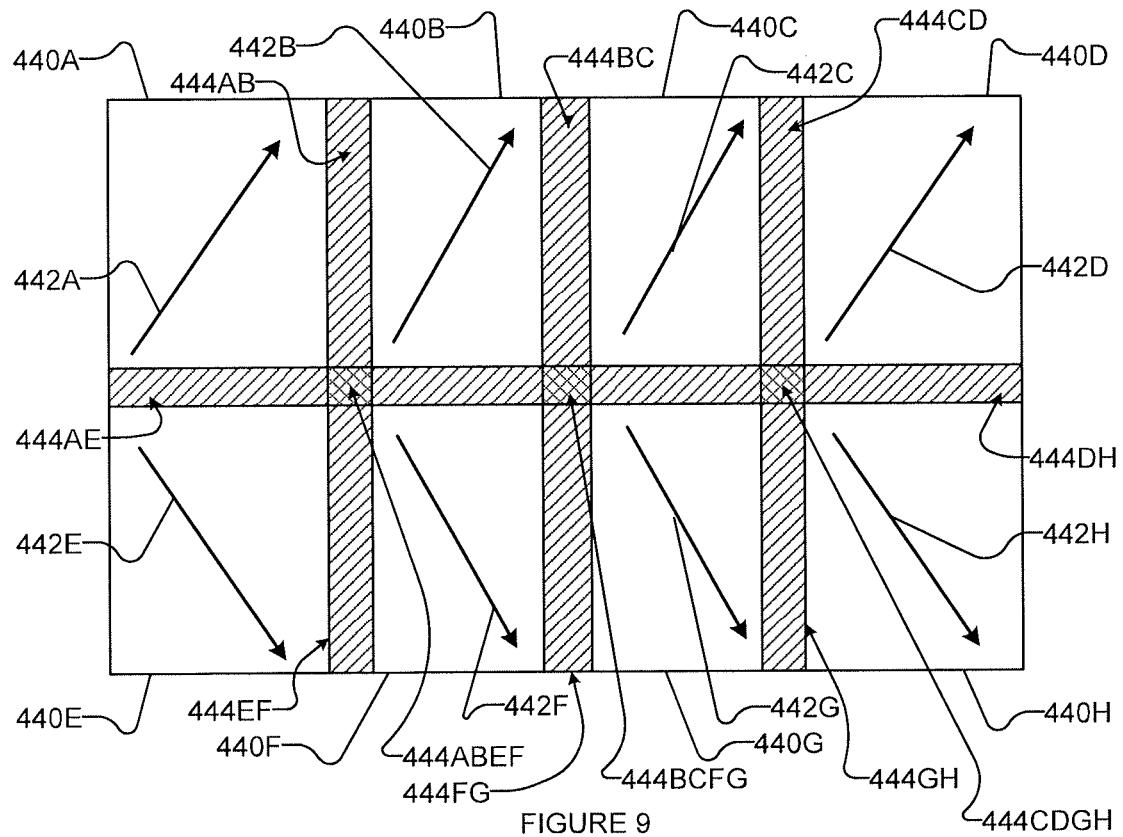
FIG. 9 is a schematic view of a combined image comprising image data captured by an exemplary arrangement of eight individual rolling-shutter image sensors according to an embodiment of this disclosure which illustrates reversal of scanning directions along a single axis.

In some embodiments, configuration module 76 configures sensors 72 to reverse their scanning directions along fewer than all available axes (e.g. axes 23, 25). For instance, configuration module 76 may only configure sensors 72 to reverse their scanning directions along column axis 25, as discussed above. An example of such an embodiment is shown in FIG. 9, where the sensors 72 corresponding to images 440A, 440B, 440C, 440D, 440E, 440F, 440G, 440H (collectively and individually images 440) have been configured without reversing their scanning directions along row axis 23. Mis-registration in overlap regions 444AE, 444BF, 444CG, 444GH (i.e. as between column-adjacent images 440) was most severe prior to configuration by method 200, and the depicted embodiment substantially reduces such mis-registration by causing the integration and read out times of corresponding pixels to be closer in time (and, in some instances, even substantially simultaneous). Mis-registration in overlap regions 444AB, 444BC, 444CD, 444EF, 444FG, 444GH (i.e. as between row-adjacent images 440) may be less severe (due to the row-column integration and read out pattern of sensors 72), and may (in suitable circumstances) be ignored.

Interpretation of Terms

Unless the context clearly requires otherwise, throughout the description and the claims:

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof; elements which are integrally formed may be considered to be connected or coupled;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

When two objects are said to be "adjacent" in this description, they may be abutting and/or spaced apart. Unless the context dictates otherwise, the term "adjacent" does not require physical contact between two objects. Two adjacent objects are not necessarily aligned in the same direction; adjacent objects may face in different directions, and/or be offset from each other by a space and/or an angle.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a computer system for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Embodiments of the invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Where a record, field, entry, and/or other element of a database is referred to above, unless otherwise indicated, such reference should be interpreted as including a plurality of records, fields, entries, and/or other elements, as appropriate. Such reference should also be interpreted as including a portion of one or more records, fields, entries, and/or other elements, as appropriate. For example, a plurality of "physical" records in a database (i.e. records encoded in the database's structure) may be regarded as one "logical" record for the purpose of the description above and the claims below, even if the plurality of physical records includes information which is excluded from the logical record.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

I claim:

1. A system for capturing and combining image data from a plurality of image sensors to generate combined images, the system comprising:
   a plurality of individual rolling-shutter image sensors comprising at least one first pair of adjacent image sensors;
   a controller configured to combine image data captured by the plurality of individual rolling-shutter image sensors to generate a combined image and store the combined image in a memory accessible to the controller, the combined image comprising first pixels from a first individual image captured by a first one of the first pair of adjacent image sensors, second pixels from a second individual image captured by a second one of the first pair of adjacent image sensors and a first boundary between the first pixels and the second pixels;
   the first one of the first pair of adjacent image sensors configured to have a first integration and readout scanning direction along a first scanning axis and the second one of the first pair of adjacent image sensors configured to have a second integration and readout scanning direction along the first scanning axis
   the first one of first pair of adjacent images sensors configured to have a third integration and readout direction along a second scanning axis perpendicular to the first scanning axis and the second one of the first pair of adjacent image sensors configured to have a fourth integration and readout scanning direction along the second scanning axis; and wherein both of the first and second integration and readout scanning directions are oriented toward the first boundary or both of the first and second integration and readout scanning directions are oriented away from the first boundary and wherein both the third and fourth integration and readout scanning directions are in the same direction along the second axis.

2. The system according to claim 1, wherein integration times for the first pixels adjacent to the first boundary and the second pixels adjacent to the first boundary are relatively close to one another when compared to configurations where one of the first and second integration and readout scan directions is oriented toward the first boundary and the other one of the first and second integration and readout scan directions is oriented away from the first boundary.

3. The system according to claim 1, wherein:

the first one of the first pair of adjacent image sensors (the first sensor) has a first field of view and the second one of the first pair of adjacent image sensors (the second sensor) has a second field of view and the first and second fields of view overlap one another in an overlap region, the boundary in the combined image located in the overlap region; and both of the first and second integration and readout scanning directions are oriented toward the overlap region or both of the first and second integration and readout scanning directions are oriented away from the overlap region.

4. The system according to claim 3, wherein:

the first sensor is configured to capture image data at a first pixel associated with the overlap region at a first integration time; and the second sensor is configured to capture image data at a second pixel associated with the overlap region and corresponding to the first pixel, therein imaging a same portion of a scene within the overlap region as the first pixel, at substantially the first integration time.

5. The system according to claim 4, wherein:

the first sensor is configured to capture image data at a third pixel associated with the overlap region at a second integration time, the third pixel spaced apart from the first pixel along a second scanning axis non-parallel with the first scanning axis; and the second sensor is configured to capture image data at a fourth pixel associated with the overlap region and corresponding to the third pixel, therein imaging a same portion of a scene within the overlap region as the first pixel, at substantially the second integration time.

6. The system according to claim 1, wherein the controller is in communication with the plurality of individual rolling-shutter image sensors and is configured, via the communication, to cause the first one of the first pair of adjacent image sensors to have the first integration and readout scanning direction and the second one of the first pair of image sensors configured to have the second integration and readout scanning direction.

7. The system according to claim 1, wherein the controller is configured to reverse an initial integration and readout scanning direction of the second one of the first pair of image sensors along the first scanning axis to cause the second one of the first pair of image sensors to have the second integration and readout scanning direction along the first scanning axis.

8. The system according to claim 1, wherein a second pair of adjacent image sensors are disposed adjacent to the first pair of image sensors having a common corner among the four image sensors, the second pair of image sensors having respective integration and readout directions on the first scanning axis and the second scanning axis.

9. A method for capturing and combining image data from a plurality of individual rolling-shutter image sensors comprising at least one first pair of adjacent image sensors to generate combined images, the method comprising:

combining image data captured by the plurality of individual rolling-shutter image sensors to generate a combined image by combining first pixels from a first individual image captured by a first one of the first pair of adjacent image sensors and second pixels from a second individual image captured by a second one of the first pair of adjacent image sensors and determining a first boundary between the first pixels and the second pixels;

configuring the first one of the first pair of adjacent image sensors to have a first integration and readout scanning direction along a first scanning axis and the second one of the first pair of adjacent image sensors to have a second integration and readout scanning direction along the first scanning axis;

configuring the first one of first pair of adjacent images sensors to have a third integration and readout direction along a second scanning axis perpendicular to the first scanning axis and the second one of the first pair of adjacent image sensors to have a fourth integration and readout scanning direction along the second scanning axis and;

wherein both of the first and second integration and readout scanning directions are oriented toward the first boundary or both of the first and second integration and readout scanning directions are oriented away from the first boundary and wherein both the third and fourth integration and readout scanning directions are in the same direction along the second axis.

10. The method according to claim 9, comprising:

orienting the first one of the first pair of adjacent image sensors to have a first field of view and the second one of the first pair of adjacent image sensors to have a second field of view such that the first and second fields of view overlap one another in an overlap region, the boundary in the combined image located in the overlap region, wherein both of the first and second integration and readout scanning directions are oriented toward the overlap region or both of the first and second integration and readout scanning directions are oriented away from the overlap region.

11. The method according to claim 9, comprising reversing an initial integration and readout scanning direction of the second one of the first pair of image sensors along the first scanning axis to cause the second one of the first pair of image sensors to have the second integration and readout scanning direction along the first scanning axis.

12. The method according to claim 9, wherein a second pair of adjacent image sensors are disposed adjacent to the first pair of image sensors having a common corner among the four image sensors, the second pair of image sensors having integration and readout directions on the first scanning axis and the second scanning axis.

\* \* \* \* \*